United States Patent [19]

Carré et al.

[11] 4,101,176

[45] Jul. 18, 1978

[54] BRAKING CORRECTION DEVICE

[75] Inventors: Jean-Jacques Carré, Montreuil; Yves Meyer, Taverny, both of France

[73] Assignee: Societe Anonyme DBA, Paris, France

[21] Appl. No.: 792,437

[22] Filed: Apr. 25, 1977

Related U.S. Application Data

[63] Continuation of Ser. No. 666,837, Mar. 15, 1976, abandoned.

[30] Foreign Application Priority Data

Apr. 1, 1975 [FR] France ................. 75 10131

[51] Int. Cl.² ................................. B60T 8/22
[52] U.S. Cl. ................................. 303/6 C; 188/195; 303/22 R
[58] Field of Search ............... 303/6 R, 6 C, 22 R, 303/22 A, 52; 188/195, 345; 74/110; 137/636

[56] References Cited

U.S. PATENT DOCUMENTS

| | | | |
|---|---|---|---|
| 3,469,890 | 9/1969 | Fulmer | 303/6 R |
| 3,650,571 | 3/1972 | Chouings | 303/6 R |
| 3,758,168 | 9/1973 | Parsons | 303/52 |
| 3,904,253 | 9/1975 | Riquart | 303/22 R |

FOREIGN PATENT DOCUMENTS 1,910,091  9/1970  Fed. Rep. of Germany ....... 137/636

*Primary Examiner*—Trygve M. Blix
*Assistant Examiner*—Edward R. Kazenske
*Attorney, Agent, or Firm*—Paul David Schoenle; Ken C. Decker

[57] ABSTRACT

A braking correction device comprises two correcting valves of which the inlets are separately connectible to two independent braking pressure sources and the outlets to two independent sets of vehicle brake actuators, each valve having a piston and being capable of controlling the pressures at its inlet and outlet in accordance with a predetermined relationship. The device is also provided with a mechanical control comprising an input member subject to the force generated by resilient return means, two projections arranged in parallel, each of which projection moving on unisson with a corresponding valve piston, a rocker member rotatable relative to the input member, the two projections cooperating with one face of the rocker member on opposite sides of its axis of rotation, a block of imcompressible elastomeric material, said block having substantially the shape of half a body of revolution and being rotatable non-deformably in a complementary cavity formed in a rigid cup fixed to the input member, the other face of the rocker member having a surface capable of making contact with the block bearing on the diametrical section of the half body of revolution.

3 Claims, 3 Drawing Figures

BRAKING CORRECTION DEVICE

This is a continuation of application Ser. No. 666,837, filed Mar. 15, 1976, now abandoned.

The invention relates to a braking correction device comprising two correcting valves and intended for a dual hydraulic brake circuit in a motor vehicle.

In a dual circuit of this type, the correcting valves generally have inlets separately connectible to two independent braking pressure sources and outlets to two independent sets of brake actuators, each valve being capable of controlling the pressures at its inlet and outlet in accordance with a predetermined relationship. The valves used are either of the pressure limiting type, in which the pressure at the outlet is limited to a predetermined value, or of the proportional pressure-compensating type, in which the pressure at the outlet increases, beyond a transition pressure, proportionately to but less than the increase in the pressure at the valve inlet. Each valve has a piston subject to resilient return means which may be associated with means for detecting the load applied to at least one axle of the vehicle. It has been customary hitherto, in the case of dual correction devices, to connect the resilient return means to the pistons of the two valves by a mechanical control of the rod and rocker type. The rotational connection between the rocker and the rod is rather fragile, and the constant vibration to which it is exposed while the vehicle is moving eventually leads to play in the connection. The distribution of the return force between the two correcting valves now becomes uneven, and once the difference is no longer negligible the braking of the vehicle may be out of balance. This disadvantage arises especially in dual hydraulic brake circuits in which the correcting valves are arranged "crosswise", with each valve controlling the brake actuators for the rear wheels on one side of the vehicle.

With a view to avoiding this disadvantage, the invention proposes a braking correction device comprising two correcting valves of which the inlets are separately connectible to two independent braking pressure sources and the outlets to two independent sets of vehicle brake actuators, each valve having a piston and being capable of controlling the pressures at its inlet and outlet in accordance with a predetermined relationship and a mechanical control comprising an input member subject to the force generated by resilient means, two projections arranged in parallel, such of which projection moving on unisson with a corresponding valve piston, a rocker member rotatable relative to the input member, the two projections cooperting with one face of the rocker member on opposite sides of its axis of rotation, a block of incompressible elastomeric material, said block having substantially the shape of half a body of revolution and being rotatable nondeformably in a complementary cavity formed in a rigid element associated or integral with the input member, the other face of the rocker member having a surface capable of making contact with the block and bearing on the diametrical section of the half body of revolution.

According to a first embodiment of the invention, the rocker member comprises protuberances in the form of portions of spheres whose axes are parallel to the direction of movement of said projections, said protuberances being capable of making contact with the adjoining ends of the projections, each of which ends presenting a flat contact face extending in a plane substantially perpendicular to the direction of movement of the projections.

According to a second embodiment of the invention, the rocker member has arms capable of abutting on the rigid element at the edges of the cavity.

According to a third embodiment of the invention, the rocker member is flat and is capable of making contact with the entire diametrical section of the block.

The invention will now be described in reference to the drawings, in which.

Figure 1:
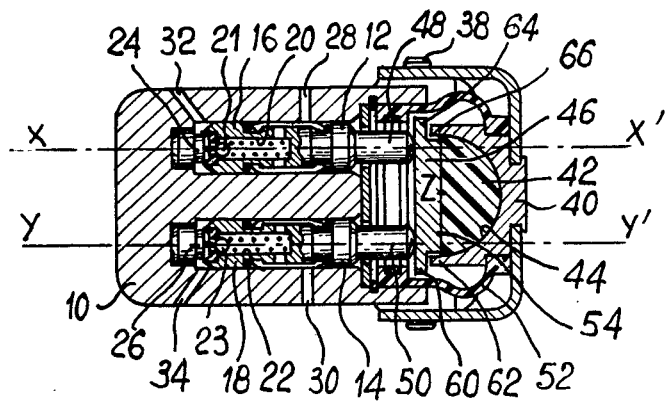
FIG. 1 illustrates a cross-section through a dual braking correction device for a vehicle, according to the invention.

FIG. 1 shows the housing 10 of a dual braking correction device for a vehicle, containing two cylindrical bores 12, 14 with parallel axes. Each bore contains a braking correcting valve of the zero-gradient compensating type, consisting essentially of a piston 16, 18 containing an axial duct 20, 22 which houses a ball 21, 23 spring-biased into fluid-tight contact. In the normal idle position illustrated, the ball 21 is held off its seat by an abutment 24, 26 fixed to the housing, to give a free connection between inlet orifices 28, 30 and outlet orifices 32, 34. Each inlet orifice can be connected to an independent source of hydraulic brake pressure, and each outlet orifice is connectible to a set of brake actuators in the vehicle. The independent pressure sources can generally be any conventional tandem master cylinder.

Each correcting valve piston 16, 18 also has two seals of identical diameters, so that after closure of the valve the pressure at the outlet orifice 32, 34 depends only on the resilient return force urging the piston 16, 18 to the left in FIG. 1. If this return force alters, more particularly increases, the valve is opened again until an increased presure can be established at the outlet orifice 32, 34. In the event of decrease the piston moves to the right in FIG. 1 to allow the pressure at the outlet orifice to decrease. A rise in pressure at the inlet orifice 28, 30 has no effect on the operation of the correcting valve described here after it has closed (that is, when the ball 21, 23 is in fluid-tight contact with its seat).

Figure 2:
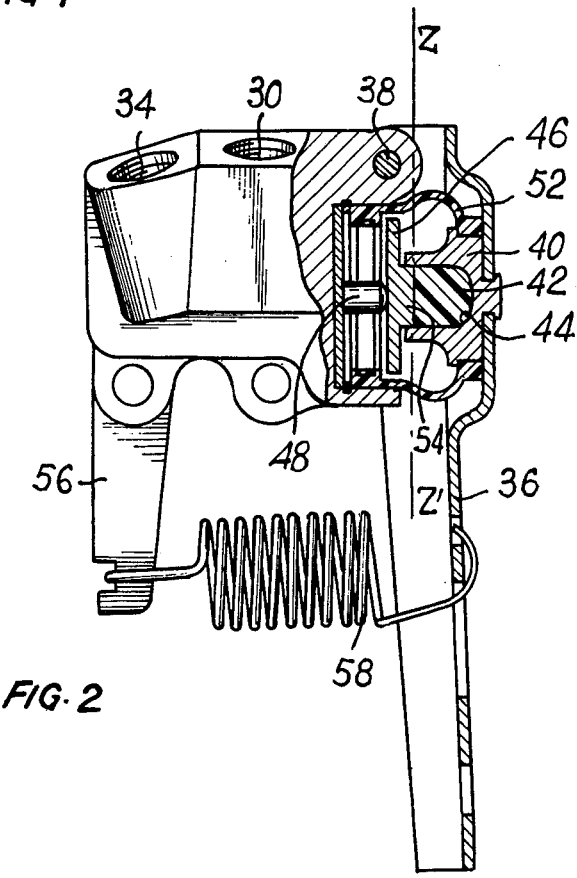
FIG. 2 is a side view, partly cut away, of the dual correction device illustrated in FIG. 1; and, FIG. 3 illustrates a cross-section through another dual correction device for a vehicle according to the invention.

The resilient return force acting on each correcting valve piston is transmitted by a mechanical control. As FIGS. 1 and 2 show, the mechanical control is composed of an input member, in this case a lever 36, pivoted on a pin 38 attached to the housing 10, a rigid element 40 such as a cup fixed to the input member, a block 42 of incompressible elastomeric material such as rubber, having the shape of half a body of revolution and mounted in a complementary cavity 44 in the cup 40, a rocker member 46, and two output members consisting in this described embodiment of projections 48, 50 integral with their respective pistons. One side of the rocker member 46 is in contact with the diametrical section of the block 42, whereas its other side makes contact on opposite sides of the block's axis of revolution ZZ' with the two projections 48, 50, which can slide parallel to one another in a support formed by the housing 10 in this embodiment and are attached to the pistons 16, 18. To exclude dust a resilient gaiter 52 is provided between the housing 10 and cup 40. FIG. 2 clearly shows the shape of the diametrical half-section of the block 42; this shape is of course part of the invention. FIG. 2 also shows that the rocker member 46 is in the form of a flat plate of which one side bears a diametrical ridge 54 which engages a short way into the cavity 44, so as to bear on the block 42 and so hold the rocker member 46 in position. The housing bears a projection 56. One end of a coil spring 58 hooks on to this projection and the other end on to the lever 36. The spring 58 acts as the resilient return means for the pistons of the correcting valves described above.

The braking correction device just described operates as follows:

Since the correction device illustrated in the drawings is designated for "crosswise" brake circuits, the two correcting valves selected have identical operating characteristics during normal operation. Thus their pistons 16, 18 have the same effective cross-sections, and their axes XX' and YY' are equidistant from the axis of revolution ZZ' of the block 42. The return force or input force generated by the spring 58 is therefore distributed evenly between the two pistons 16, 18 as two output forces when the brake circuit is operating normally. In FIG. 1, the point of application of the input force is at Z. If there is a transistory imbalance during braking, the block 42 is liable to turn slightly on the axis ZZ' to restore the pressure balance between the two independend circuits. For example, a slight leak in the circuit associated with the orifice 34 causes the piston 18 to move to the left in FIG. 1, and this will be followed immediately by a clockwise rotation of the block 42 and by movement of the piston 16 to the right in the Figure, with a consequent pressure reduction at the outlet orifice 32. This movement will then be followed by opening of the valve 23, restoring the pressure at the outlet orifice 34 and moving the pad 42 and piston 16 in the opposite direction.

Let us now assume total failure of a brake circuit associated with one valve, for example the correcting valve containing the piston 16. The rocker member 46 and block 42 will then rotate counterclockwise, and in the embodiment here described the edge 60 of the rocker member 46 will abut on the edge 62 of the cavity 44. The return force acting on the projection 50 as therefore doubled, and it equals the force transmitted by the lever 36 to the cup 40. Note from FIG. 1 that slight radial clearance is provided between the ridge 54 and the edges 62, 66 of the cavity, to enable the rocker member 46 to follow the movements of the block 42. The braking pressure at the outlet orifice 34 therefore doubles. In a variant (not shown) of the dual correction device herein described, the axial position of the stops formed by the edges 62, 66 is improved as follows. Each edge 62, 66 comprises a stop screw capable of engaging one of the arms 60, 64, the screws being mounted in the cup so as to be movable parallel to the axes XX', YY' for adjustment.

Within the scope of the invention, the mechanical control just described may be modified in various ways, as follows. Firstly, the shape of a diametrical half-section of the rubber block is not restricted to that shown in FIG. 2, but may of course be modified. By way of example only, the rubber block in another ambodiment of the invention is hemispherical. Similarly the rigid element 40 may be integral with the input member.

To improve rotation of the block in its cup, it may be desirable to lubricate the contact surfaces between these two components. In another embodiment of the invention (not shown), the ridge 54 makes contact with the diametrical section of the block by way of two peripherical surfaces substantially equidistant from the axis of revolution ZZ' of the pad. The two peripheral surfaces are two peripheral axial beads provided either on the ridge or on the pad itself.

Similarly, the condition of the contact surfaces between the rubber block and the bottom of the cavity 44 may be altered, so that during normal operation of the dual braking correction device the rubber block, being compressed between the rocker member and the rigid cup, does not carry out the slight rotational motions mentioned at the beginning of the description of operation, but rotates only in the event of total failure of a brake circuit associated with one of the correcting valves. Obviously, this choice is made by the designer of the vehicle according to the particular characteristics of the brake circuit for which the dual braking correction device is intended. The particular advantage of this last feature is that the force transmitted by the cup 40 to the two correcting valves can be distributed very accurately even if the axes XX' and YY' are not precisely equidistant from the axis ZZ'. This enables manufacturing tolerances to be reduced in some cases.

The correction device can also be modified by eliminating the abutments 60, 64 on the rocker member 46, so that, if a correcting valve circuit fails, the rocker member 46 will pivot relative to the housing about the end of the projection 48 or 50 belonging to the valve with the faulty circuit, so that the return force acting on the valve for the intact circuit will be half the force transmitted by the cup 40, owing to the arrangement of the lever arms of the rocker member 46. Consequently, with this specific structure the failure of one brake circuit has no appreciable effect on the brake pressure in the other, intact circuit.

Alternatively, a position may be selected which is part way between making no change at all in the brake pressure in the valve for the intact circuit and doubling this pressure, by making the abutments 60, 64 cooperate with two external abutments on the housing 10. The position of these two external abutments on the housing 10 is not illustrated, but it is such that one abutment on the rocker member, for example the abutment 60 if the piston 18 is associated with the faulty circuit, comes to bear on the corresponding external abutment on the housing before the abutment 64 comes to bear on the abutment 66 on the cup 40. The distribution of the force to the piston for the valve still in operation occurs as a function of the ratio between the respective lever arms separating the fixed point of contact between the rocker member 46 and the external abutment on the housing from the points of application of the input and output forces.

Still within the scope of the invention, the braking correction device may be modified as follows. The resilient return means 58 may be associated with means for detecting the load acting on at least one of the axles of the vehicle, so that the tension of the spring 58 varies with the changes in the load on this axle. To this end the free end of the lever 36 is cut away so that it can be connected to a rod system belonging to a load detecting mechanism. If for example, the housing 10 is mounted on a suspended part of the vehicle, the other end of the load detecting mechanism can be attached to an unsuspended part of the vehicle. The provision of a load detecting mechanism is particularly useful in a braking correction device with zero-gradient compensators like those described above, since the brake pressure can be reduced when the load on the corresponding axle is lighter.

Without departing from the scope of the invention the type of the correcting valve may be changed. One example is given in the device now described in reference to the FIG. 3 wherein the valve piston 16 and 18 are stepped.

Figure 3:
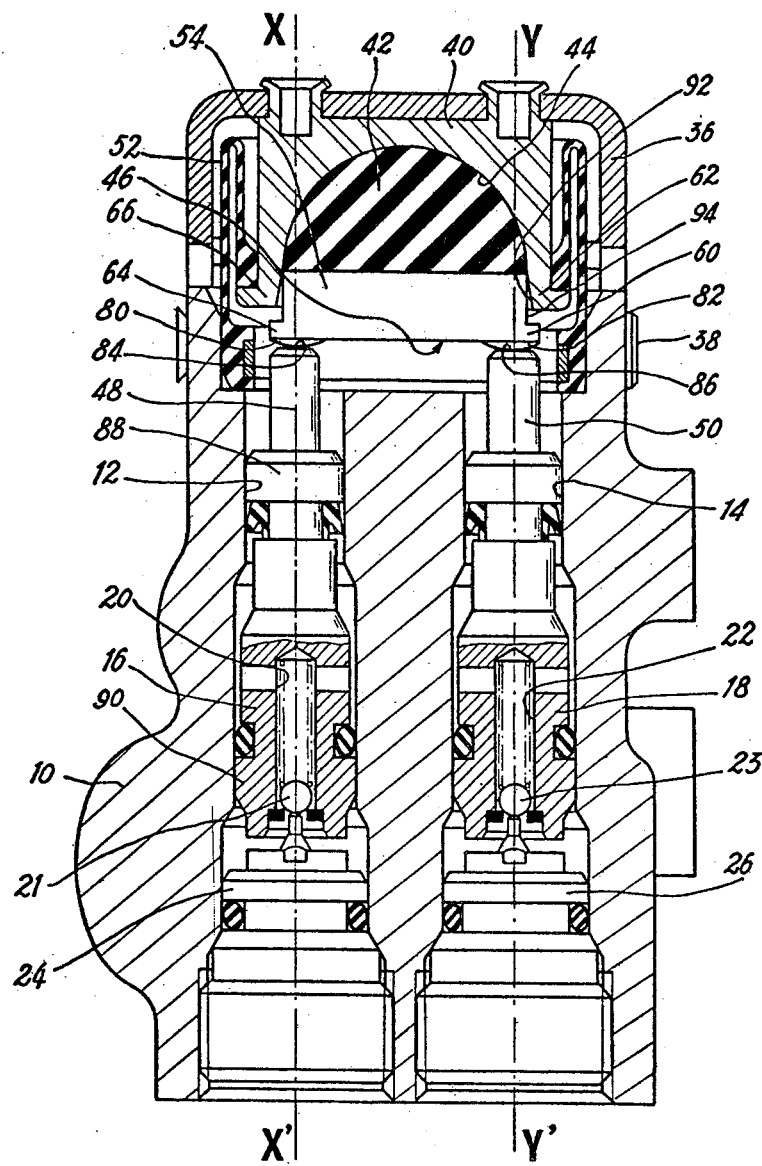

The correction device shown in the FIG. 3 is very similar to that described in reference to FIGS. 1 and 2 and will therefore not be described in full. Elements already described in detail bear the same reference numeral.

The main difference between the two embodiments of the invention consists in that side of the rocker member 54 adjoining the ends of the output members 48, 50 bears protuberances 80, 82 substantially in the form of portions of spheres and having axes parallel to the axes XX' and YY', which represent the directions in which the correcting valves slide. In addition, the ends of the output members present flat contact faces 84, 86 extending in a plane perpendicular to the axes XX' and YY'. To improve contact, both these flat faces and the protuberances 80, 82 have undergone hardening treatment.

According to a variant of the invention, the protuberances are in the form of two steel balls set into the rocker member, so that it is unnecessary to harden the entire rocker member.

If the rigid cup 40 is not arranged perfectly symmetrically relative to the axes XX' and YY', the return force will still be distributed equally to each output member. The fact that the points at which the reaction forces are applied to each piston 16, 18 are slightly out of alignment with the sliding axes XX', YY' does not interfere with the operation of the correcting valves, since the latter are retained satisfactorily in their bore by two mutually spaced bearing surfaces, as indicated at 88, 90 in the Figure.

Lastly, it should be noted that that face of the rocker member adjoining the block 42 extends over the entire diameter of the block, and the rigid cup 40 bears two bevels 92, on one of which a lateral surface 94 of the rocker member can abut if one of the brake circuits fails.

What we claim is:
1. A brake correction device comprising:
a housing defining first and second bores therewithin;
first and second inlet ports respectively communicating with said first and second bores;
first and second outlet ports respectively communicating with said first and second bores;
a first correcting valve means mounted in said first bore between the first inlet and outlet ports;
a second correcting valve means mounted in said second bore between the second inlet and outlet ports;
each said first and second correcting valve means having a piston controlling communication between corresponding inlet and outlet ports, said piston having a projection movable therewith;
input lever means pivotally mounted with respect to said housing, said input lever means carrying a rigid element having a cavity and said rigid element being movable with said input lever means when the latter is pivoted relative to said housing;
a block of elastomeric material disposed within the rigid element cavity, said block being movable with said rigid element and rotatable nondeformably within the rigid element cavity; and
a rocker member engaging said block to retain the latter within the cavity and rotating with said block relative to the rigid element, said rocker member also engaging the projection of each piston to impart movement to each piston in one direction as said input lever means pivots relative to the housing.

2. The brake correction device of claim 1 in which said rocker member includes a ridge that extends partly into the rigid element cavity and said ridge engages said block of elastomeric material at a position part way into the cavity.

3. The brake correction device of claim 1 in which said rocker member includes arms that are normally spaced from the rigid element, but are engageable with said rigid element when said rocker member is rotated with said block relative to the rigid element.

* * * * *